(12) United States Patent
Endo

(10) Patent No.: US 7,866,639 B2
(45) Date of Patent: Jan. 11, 2011

(54) FLUID-FILLED CYLINDRICAL VIBRATION-DAMPING DEVICE

(75) Inventor: Masami Endo, Niwa-gun (JP)

(73) Assignee: Tokai Rubber Industries, Ltd., Aichi (JP)

( * ) Notice: Subject to any disclaimer, the term of this patent is extended or adjusted under 35 U.S.C. 154(b) by 0 days.

(21) Appl. No.: 12/588,497

(22) Filed: Oct. 16, 2009

(65) Prior Publication Data

US 2010/0140856 A1 Jun. 10, 2010

(30) Foreign Application Priority Data

Dec. 9, 2008 (JP) ............................. 2008-313431
May 28, 2009 (JP) ............................. 2009-128820

(51) Int. Cl.
*F16F 1/36* (2006.01)
(52) U.S. Cl. .................................. 267/140.12; 267/219
(58) Field of Classification Search . 267/140.12–141.7; 248/562, 566
See application file for complete search history.

(56) References Cited

U.S. PATENT DOCUMENTS

| | | | | |
|---|---|---|---|---|
| 4,702,346 A * | 10/1987 | Uno et al. | .................... | 181/207 |
| 4,717,111 A * | 1/1988 | Saito | ...................... | 267/140.12 |
| 4,871,152 A * | 10/1989 | Funahashi | .............. | 267/140.12 |
| 5,013,012 A | 5/1991 | Jouade | | |
| 5,042,785 A * | 8/1991 | LeFol et al. | ............ | 267/140.12 |
| 5,172,893 A * | 12/1992 | Bouhier et al. | ......... | 267/140.12 |
| 5,489,086 A * | 2/1996 | Kanda | .................... | 267/140.12 |
| 5,509,643 A * | 4/1996 | Carstens et al. | ....... | 267/140.12 |
| 6,802,497 B2 * | 10/2004 | Hettler | .................. | 267/140.12 |

FOREIGN PATENT DOCUMENTS

| | | |
|---|---|---|
| JP | A-60-168931 | 9/1985 |
| JP | A-60-172743 | 9/1985 |
| JP | A-3-9137 | 1/1991 |
| JP | U-4-25051 | 2/1992 |
| JP | U-5-22893 | 3/1993 |
| JP | A-11-37206 | 2/1999 |

* cited by examiner

Primary Examiner—Christopher P Schwartz
(74) Attorney, Agent, or Firm—Oliff & Berridge, PLC

(57) ABSTRACT

A fluid-filled cylindrical vibration-damping device including a main rubber elastic body elastically connecting an inner shaft member and an outer cylindrical member with each other. A pair of first fluid chambers are formed on diametrically opposite sides of the inner shaft member and a pair of second fluid chambers are formed being diametrically opposed to each other such that an opposing direction of the second fluid chambers is orthogonal to an opposing direction of the first fluid chambers. Each partition wall that partitions the first fluid chamber and the second fluid chamber extends in a direction in more proximity to the opposing direction of the first fluid chambers than to the opposing direction of the second fluid chambers so that spring rigidity as measured in the opposing direction of the first fluid chambers is set greater than spring rigidity as measured in the opposing direction of the second fluid chambers.

8 Claims, 14 Drawing Sheets

US 7,866,639 B2

FLUID-FILLED CYLINDRICAL VIBRATION-DAMPING DEVICE

INCORPORATED BY REFERENCE

The disclosure of Japanese Patent Application No. 2008-313431 filed on Dec. 9, 2008 and No. 2009-128820 filed on May 28, 2009, each including the specification, drawings and abstract, are incorporated herein by reference in its entirety.

BACKGROUND OF THE INVENTION

1. Field of the Invention

The present invention relates generally to a cylindrical vibration-damping device adapted for use as an automotive suspension bushing, for example, and more particularly to a cylindrical vibration-damping device of fluid-filled type, which is capable of exhibiting vibration damping effects based on the flow action of a fluid filling the interior.

2. Description of the Related Art

There are any number of known cylindrical vibration-damping devices proposed to date for interposition between components that make up a vibration transmission system in order to provide vibration damped linkage or vibration damped support of the components to one another. These cylindrical vibration-damping devices have a construction in which an inner shaft member adapted to be mounted to one component of the vibration transmission system and an outer cylindrical member spaced apart peripherally outward from the inner shaft member are elastically connected with each other by a main rubber elastic body. In an effort to improve vibration damping capabilities of cylindrical vibration-damping devices, there have also been proposed cylindrical vibration-damping devices of fluid-filled type which include a plurality of fluid chambers filled with a non-compressible fluid, and an orifice passage connecting the fluid chambers with one another. Fluid-filled cylindrical vibration-damping devices generally have a construction which includes a pair of fluid chambers opposed to each other in one diametrical direction (which coincides with the principal vibration input direction), and an orifice passage connecting the pair of fluid chambers with one another. On the basis of relative pressure differential arising between the pair of fluid chambers, fluid flow will be produced through the orifice passage and vibration damping action will be attained on the basis of resonance action etc. of the fluid.

In a fluid-filled cylindrical vibration-damping device of this kind, at times of vibration input in the opposing direction of the pair of the fluid chambers, relative pressure fluctuations will be effectively produced between the fluid chambers, and excellent vibration damping action will be attained on the basis of flow action of the fluid. On the other hand, at times of vibration input in other directions such as the direction orthogonal to the opposing direction of the fluid chambers for example, it may suffer from a problem that relative pressure fluctuations between the fluid chambers will not be effectively produced, and therefore enough vibration damping action will not be attained.

There has been proposed, in Japanese Unexamined Patent Publication No. JP-A-3-9137, a fluid-filled cylindrical vibration-damping device that is able to attain effective vibration damping action against each of several types of vibration input in different directions. Specifically, the fluid-filled cylindrical vibration-damping device has four fluid chambers having a prescribed circumferential width and arranged at a uniform angular interval of 90° in the circumferential direction. With this arrangement, effective vibration damping action will be attained against each of vibration inputs in two directions orthogonal to each other.

However, in the fluid-filled cylindrical vibration-damping device disclosed in JP-A-3-9137, since the four fluid chambers having an identical shape with one another are arranged at a uniform interval in the circumferential direction, the springs of two diametrical directions orthogonal to each other are equal. Therefore, in cases where, for example, different vibration damping characteristics are required with respect to two diametrical directions perpendicular to the axis of the device, it was difficult to set different spring constants to different directions and to fully meet required characteristics.

Moreover, since the four fluid chambers having the identical shape with one another are arranged at a uniform interval along the circumference, it was difficult to tune so as to exhibit excellent vibration damping capabilities especially in principal vibration input direction, and sometimes required vibration damping capabilities were not able to be satisfactorily realized.

SUMMARY OF THE INVENTION

It is therefore one object of this invention to provide a fluid-filled cylindrical vibration-damping device of novel construction capable of achieving intended vibration-damping action against each of several types of vibration input in different directions while realizing intended vibration damping characteristics against vibrations in the axis-perpendicular directions by means of imparting different spring rigidities.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled cylindrical vibration-damping device including: an inner shaft member; an outer cylindrical member spaced apart peripherally outward from the inner shaft member; a main rubber elastic body elastically connecting the inner shaft member and the outer cylindrical member with each other; a plurality of pocket portions provided in the main rubber elastic body so as to open onto an outer peripheral face of the main rubber elastic body; a plurality of fluid chambers defined by covering the pocket portions with the outer cylindrical member each filled with a non-compressible fluid; at least one orifice passage connecting the plurality of fluid chambers with one another, wherein: the plurality of fluid chambers comprise a pair of first fluid chambers diametrically opposed to each other with the inner shaft member being interposed therebetween and a pair of second fluid chambers diametrically opposed to each other such that an opposing direction of the pair of the second fluid chambers is orthogonal to an opposing direction of the pair of the first fluid chambers; and each of partition walls that circumferentially partitions the first fluid chamber and the second fluid chamber extends in a direction in more proximity to the opposing direction of the pair of the first fluid chambers than to the opposing direction of the pair of the second fluid chambers so that spring rigidity that is adapted to be exhibited by the partition walls at times of vibration input in the opposing direction of the pair of the first fluid chambers is set greater than spring rigidity that is adapted to be exhibited by the partition walls at times of vibration input in the opposing direction of the pair of the second fluid chambers.

According to the first mode, the spring rigidity that is adapted to be exhibited by the partition walls at times of vibration input in the opposing direction of the pair of the first fluid chambers is set greater than the spring rigidity that is adapted to be exhibited by the partition walls at times of vibration input in the opposing direction of the pair of the second fluid chambers. This makes it possible to impart different vibration damping characteristics with respect to two diametrical directions perpendicular to the axis of the device, thereby realizing intended vibration damping capabilities and supporting capabilities.

Moreover, since there are formed four fluid chambers, vibration damping effect on the basis of flow action of a fluid will attain effectively, thereby improving vibration damping capabilities. In particular, the four fluid chambers are formed unequally in size along the circumference and the second fluid chambers reserve a large dimension in the circumferential direction. This allows the second fluid chambers to ensure a large effective piston surface area at times of vibration input in the opposing direction of the second fluid chambers. Consequently, by orienting the opposing direction of the pair of the second fluid chambers to the principal vibration input direction, vibration damping effect on the basis of flow action of a fluid against the principal vibration input will be obtained advantageously.

A second mode of the invention provides a fluid-filled cylindrical vibration-damping device according to the first mode, wherein a stopper mechanism is provided within the pair of the second fluid chambers for limiting an amount of relative displacement of the inner shaft member and the outer cylindrical member in the opposing direction of the pair of the second fluid chambers by means of projecting in an opposing direction of the inner shaft member and the outer cylindrical member so as to abut an inner shaft member side of the stopper mechanism and the outer cylindrical member against each other.

According to the second mode, in the case where vibration input in the opposing direction of the pair of the second fluid chambers causes self-motivated shear deformation to the partition walls of the main rubber elastic body, the stopper mechanism limits the amount of elastic deformation of the main rubber elastic body. Consequently, damage to the partition walls due to excessive shear deformation will be prevented, making it possible to improve durability.

A third mode of the invention provides a fluid-filled cylindrical vibration-damping device according to the second mode, wherein an outside peripheral face of the inner shaft member which partially defines walls of the pair of the second fluid chambers is covered by a cushion rubber layer integrally formed with the main rubber elastic body; an orifice forming member which forms the orifice passage has a round tubular shape defined by assembling a pair of half orifice bodies respectively having half circular tube shape and is superposed against and attached to an inside peripheral face of the outer cylindrical member; and a pair of stopper projections which project from the half orifice bodies within the pair of the second fluid chambers are situated in opposition to each other with the inner shaft member being interposed therebetween in a diametrical direction perpendicular to an axis of the inner shaft member.

According to the third mode, the stopper projections which constitute the stopper mechanism are provided to the half orifice bodies and arranged so as to project towards the inner shaft member side, thereby ensuring large free length of the main rubber elastic body which is bonded by vulcanization to the inner shaft member. As a result, at times of input of large load when the stopper mechanism exhibits its displacement-limiting action, it is possible to prevent local and excessive stress acting on the main rubber elastic body, realizing improvement of durability.

A fourth mode of the invention provides a fluid-filled cylindrical vibration-damping device according to any one of the first through third modes, wherein in projection view in the opposing direction of the pair of the first fluid chambers, entire first fluid chambers overlap the inner shaft member while at least a part of the partition walls which partially define walls of the first fluid chambers overlaps the inner shaft member along an entire diametrical length thereof.

According to the fourth mode, at times of vibration input in the opposing direction of the pair of the first fluid chambers, the inside peripheral wall face and the outside peripheral wall face of each of the first fluid chambers will be relatively displaced in the direction of vibration input over generally the entirety thereof and act as a piston. In this way, it is possible to ensure a large effective piston surface area of the first fluid chambers, so that large pressure fluctuations will be produced with respect to the first fluid chambers. This makes it possible to more efficiently attain vibration damping action on the basis of flow action of a fluid.

In addition, at least a part of the partition walls overlaps the inner shaft member along the entire diametrical length thereof With this arrangement, at times of vibration input in the opposing direction of the pair of the first fluid chambers, it is possible to produce more self-motivated compressive deformation with regard to deformation of the partition walls. This allows to set a greater spring rigidity to the partition walls as measured in the opposing direction of the pair of the first fluid chambers, making it possible to set a larger spring ratio with respect to spring rigidity of the partition walls as measured in the opposing direction of the pair of the second fluid chambers.

A fifth mode of the invention provides a fluid-filled cylindrical vibration-damping device according to the fourth mode, wherein the inner shaft member includes outside peripheral face projections which project towards the opposing direction of the pair of the second fluid chambers; and wherein in projection view in the opposing direction of the pair of the first fluid chambers, the first fluid chambers as well as the partition walls entirely overlap the inner shaft member inclusive of the outside peripheral face projections.

According to the fifth mode, in projection view in the opposing direction of the pair of the first fluid chambers, the partition walls overlap the inner shaft member and the outside peripheral face projections over a wider area. With this arrangement, at times of vibration input in the opposing direction of the pair of the first fluid chambers, it is possible to produce more self-motivated compressive deformation with regard to deformation of the partition walls. This allows to more advantageously set a greater spring rigidity to the partition walls as measured in the opposing direction of the pair of the first fluid chambers, making it possible to set a large spring ratio of spring rigidity between two different diametrical directions perpendicular to the axis of the device. In this mode, the first fluid chambers and the partition walls need not to overlap the inner shaft member inclusive of the outside peripheral face projections across the entire axial length thereof, and in preferred practice they partially overlap in the axial center section thereof.

A sixth mode of the invention provides a fluid-filled cylindrical vibration-damping device according to any one of the first through fifth modes, wherein in projection view in the opposing direction of the pair of the second fluid chambers, both circumferential ends in each pair of the second fluid chambers are situated on circumferentially opposite sides of the inner shaft member, while being away from the inner shaft member.

According to the sixth mode, at times of vibration input in the opposing direction of the pair of the second fluid chambers, it is possible to produce more self-motivated shear deformation with regard to deformation of the partition walls. This allows to set a smaller spring rigidity to the partition walls as measured in the opposing direction of the pair of the second fluid chambers. Therefore, it is possible to set a larger difference between the spring rigidity of the partition walls as measured in the diametrical direction of opposition of the pair of the first fluid chambers and the spring rigidity of the partition walls as measured in the diametrical direction of opposition of the pair of the second fluid chambers.

Furthermore, in the second fluid chambers, not only the portions which overlap the inner shaft member but also a part of the portions which jut out to circumferentially opposite sides of the inner shaft member will act as a piston at times of vibration input in the opposing direction of the pair of the second fluid chambers. Accordingly, pressure fluctuations will be more efficiently produced in the second fluid chambers, making it possible to more advantageously attain vibration damping action on the basis of flow action of a fluid.

A seventh mode of the invention provides a fluid-filled cylindrical vibration-damping device according to any one of the first through sixth modes, wherein the at least one orifice passage comprises: a first orifice passage which connects one of the first fluid chambers with one of the second fluid chambers; and a second orifice passage which connects another of the first fluid chambers with another of the second fluid chambers.

According to the seventh mode, excellent vibration damping action will be exhibited on the basis of flow action of a fluid induced to flow through the first and second orifice passages against both of vibration input in the diametrical direction of opposition of the pair of the first fluid chambers and vibration input in the diametrical direction of opposition of the pair of the second fluid chambers.

Moreover, by means of tuning the first and second orifice passages to different frequency ranges from each other, effective vibration damping action will be exhibited against several types of vibration input in different directions and having different frequencies.

An eighth mode of the invention provides a fluid-filled cylindrical vibration-damping device according to any one of the first through sixth modes, wherein the at least one orifice passage comprises: a third orifice passage which connects the pair of the second fluid chambers with each other; a fourth orifice passage which connects one of the second fluid chambers with one of the first fluid chambers; and a fifth orifice passage which connects the one of the second fluid chambers with another of the first fluid chambers.

According to the eighth mode, when static load is input in the opposing direction of the pair of the second fluid chambers and then opposing positive/negative pressure fluctuations which have an approximately equal absolute value are induced between the pair of the second fluid chambers, the sealed fluid will flow between the pair of the second fluid chambers through the third orifice passage. As a result, pressure fluctuations induced in the second fluid chambers will be dispelled rapidly, preventing rise of spring constant due to the fluid pressure fluctuation. Thus, intended vibration damping capabilities will be realized when the device is installed in a vehicle.

Furthermore, one of the second fluid chambers is connected not only with the other of the second fluid chambers but also with the pair of the first fluid chambers through the fourth and fifth orifice passages. With this arrangement, by means of setting an appropriate tuning frequency to each of the third, fourth and fifth orifice passages, it is also possible to attain effective vibration damping action against vibrations over a wider frequency range in the opposing direction of the pair of the second fluid chambers.

In addition, the pair of the first fluid chambers are connected with each other via the one of the second fluid chambers. With this arrangement, static pressure fluctuations produced between the pair of the first fluid chambers will be dispelled rapidly owing to the fluid flow. Moreover, when vibration is input in the opposing direction of the pair of the first fluid chambers, fluid flow induced through the fourth and fifth orifice passages will afford vibration damping action on the basis of resonance action etc. of the fluid.

In accordance with the present invention, each of the partition walls that circumferentially partitions the first fluid chamber and the second fluid chamber extends in a specific direction which is in proximity to the opposing direction of the pair of the first fluid chambers. This makes it possible, with respect to vibrations input in the axis-perpendicular direction, to readily set spring rigidities different from each other to two diametrical directions perpendicular to the axis of the device and to attain excellent vibration damping action by utilizing the flow action of a fluid.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 23A demonstrates vibration damping characteristics in the opposing direction of a pair of first fluid chambers, and FIG. 23B demonstrates vibration damping characteristics in the opposing direction of a pair of second fluid chambers.

DETAILED DESCRIPTION OF PREFERRED EMBODIMENTS

Figure 1:
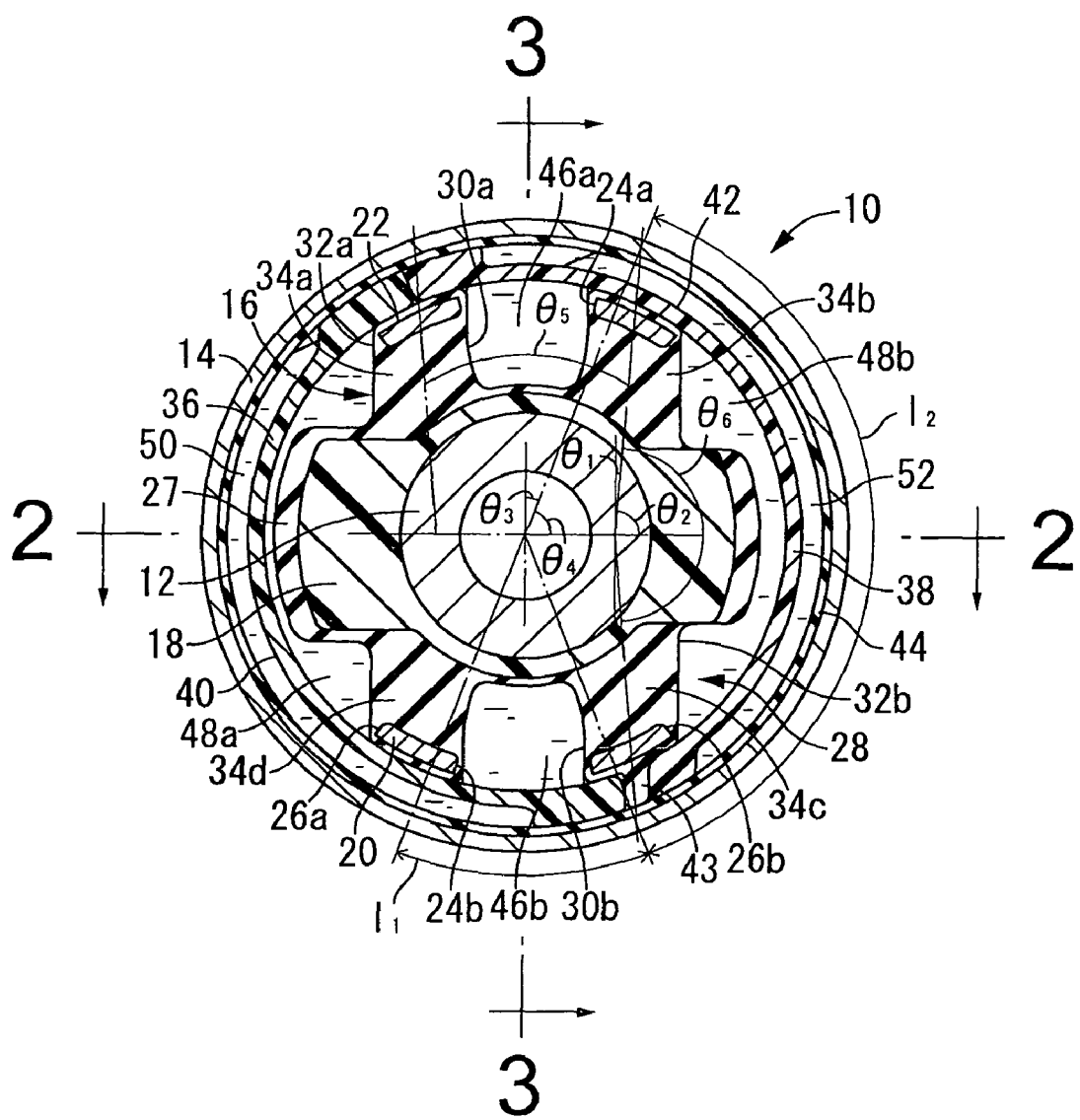
FIG. 1 is a transverse cross sectional view of a fluid-filled cylindrical vibration-damping device in the form of an automotive suspension bushing according to a first embodiment of the present invention, taken along line 1-1 of FIG. 2.
Figure 2:
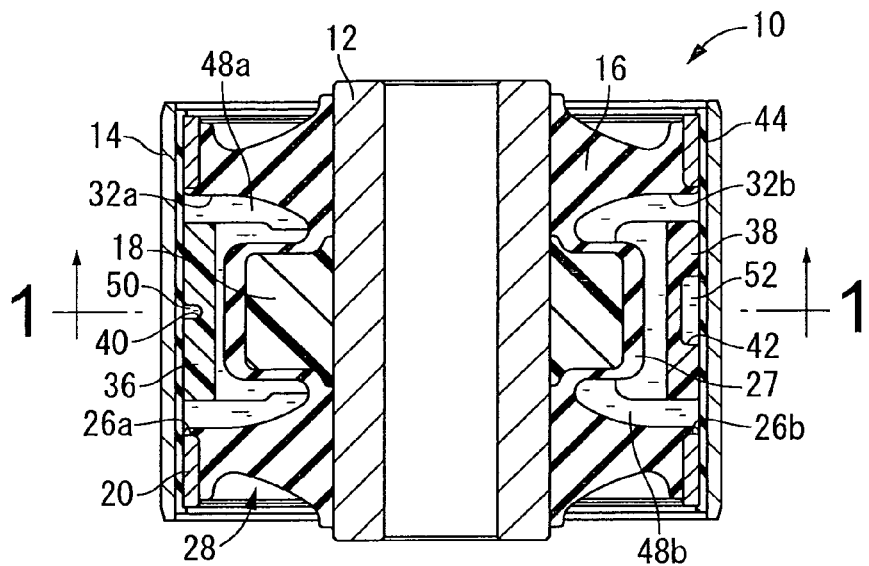
FIG. 2 is a cross sectional view taken along line 2-2 of FIG. 1.
Figure 3:
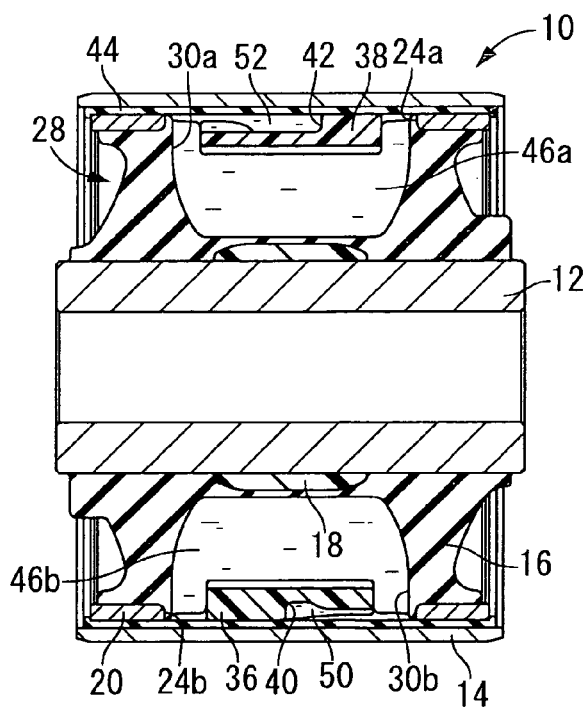
FIG. 3 is a cross sectional view taken along line 3-3 of FIG. 1.

Referring first to FIGS. 1 through 3, there is depicted an automotive suspension bushing 10 according to a first embodiment of a fluid-filled cylindrical vibration-damping device constructed in accordance with the present invention. The suspension bushing 10 has a structure in which an inner shaft member 12 of metal and an outer cylindrical member 14 of metal are elastically connected with each other in the diametrical direction by a main rubber elastic body 16. The inner shaft member 12 is adapted to be mounted onto a vehicle body, while the outer cylindrical member 14 is adapted to be mounted to a suspension arm by being inserted into an arm eye thereof. With this arrangement, the suspension bushing 10 provides vibration-damped linkage of the vehicle body and the suspension arm. In the description hereinbelow, the vertical direction refers to the vertical direction in FIG. 1, which coincides with the vertical direction as the suspension bushing 10 is installed in a vehicle. Meanwhile, the left-right direction refers to the left-right direction in FIG. 1, which coincides with the left-right direction of an automobile as the suspension bushing 10 is installed in a vehicle.

To describe in greater detail, the inner shaft member 12 has a generally round tube shape extending in a straight line with a thick wall and small diameter, and is a highly rigid member formed of metal material such as iron or aluminum alloy. A stopper member 18 is installed around the inner shaft member 12. The stopper member 18 is a rigid member formed of synthetic resin or the like, and fastened externally onto the inner shaft member 12 while projecting out to opposite sides in one diametrical direction. In the present embodiment, one projecting portion of the stopper member 18 which projects out to one side in the diametrical direction is made narrower in the circumferential direction rather than the other projecting portion which projects out to the other side. The stopper member 18 that is a separate element from the inner shaft member 12 defines outside peripheral face projections according to the present embodiment.

To the outer peripheral side of the inner shaft member 12 is disposed an intermediate sleeve 20. The intermediate sleeve 20 has a thin, large-diameter, generally round tube shape overall and has a shouldered contour with its axial medial section small in diameter. In other words, in axial medial section of the intermediate sleeve 20, a mating slot 22 concaved diametrically inward is formed continuously over the entire circumference.

First window portions 24a, 24b and second window portions 26a, 26b are formed in the small-diameter section of the intermediate sleeve 20. The first and second window portions 24a, 24b and 26a, 26b pierce the intermediate sleeve 20 in the diametrical direction coincident with its thickness direction and extend a prescribed length in the circumferential direction. The first window portions 24a, 24b have a smaller dimension in the circumferential direction than do the second window portions 26a, 26b. Moreover, in the present embodiment, the axial dimensions of the first window portions 24a, 24b and the second window portions 26a, 26b are made generally equal to one another. In addition, the pair of the first window portions 24a, 24b are formed to opposite sides so as to be opposed to each other in one diametrical direction while the pair of the second window portions 26a, 26b are formed to opposite sides so as to be opposed to each other in another diametrical direction which is orthogonal to the opposing direction of the pair of the first window portions 24a, 24b.

The intermediate sleeve 20 is positioned spaced apart peripherally outward from the inner shaft member 12 so as to encircle the inner shaft member 12. A main rubber elastic body 16 is disposed diametrically between the inner shaft member 12 and the intermediate sleeve 20. The main rubber elastic body 16 has a thick-walled, generally round tube shape overall and is arranged with its inside peripheral face bonded by vulcanization to the inner shaft member 12 and the stopper member 18 while with its outside peripheral face bonded by vulcanization to the intermediate sleeve 20. With this arrangement, the inner shaft member 12 with the stopper member 18 installed thereon and the intermediate sleeve 20 are elastically connected with each other by the main rubber elastic body 16. The outside peripheral face of the stopper member 18 is covered entirely by a rubber sheath layer 27 integrally formed with the main rubber elastic body 16 and the rubber sheath layer 27 is particularly thick at sections which are affixed to the projecting distal ends of the stopper member 18. In the present embodiment, the main rubber elastic body 16 takes the form of an integrally vulcanization molded component 28 incorporating the inner shaft member 12, the stopper member 18 and the intermediate sleeve 20.

The main rubber elastic body 16 includes a pair of first pocket portions 30a, 30b and a pair of second pocket portions 32a, 32b. The first pocket portions 30a, 30b are of recessed shape with a prescribed width in the circumferential direction and open onto the outside peripheral face in the axial medial section of the main rubber elastic body 16. The pair of the first pocket portions 30a, 30b are formed so as to be opposed to each other in one diametrical direction (the vertical direction in FIG. 1).

The second pocket portions 32a, 32b are of recessed shape with a prescribed width in the circumferential direction and open onto the outside peripheral face in the axial medial section of the main rubber elastic body 16. The pair of the second pocket portions 32a, 32b are formed so as to be opposed to each other in another diametrical direction which is orthogonal to the opposing direction of the pair of the first pocket portions 30a, 30b (the sideways direction in FIG. 1).

Figure 4:
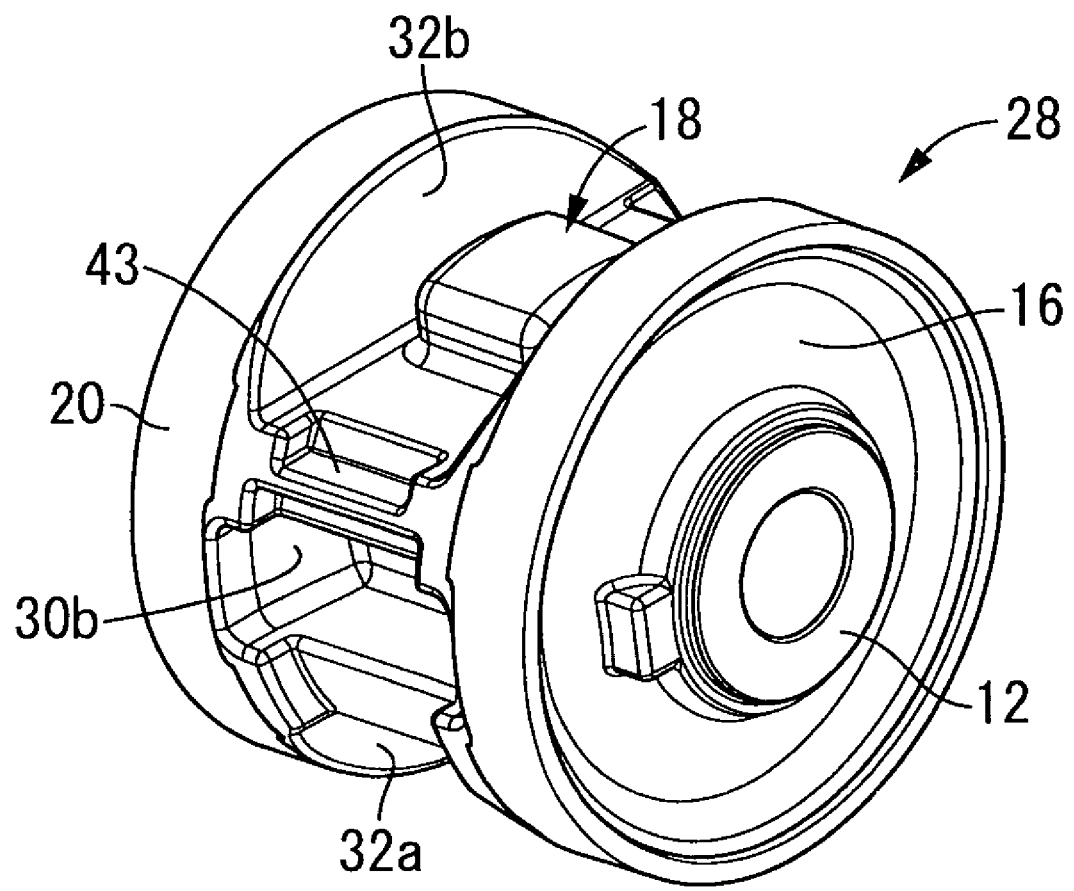
FIG. 4 is a perspective view of an integrally vulcanization molded component of the suspension bushing of FIG. 1.
Figure 5:
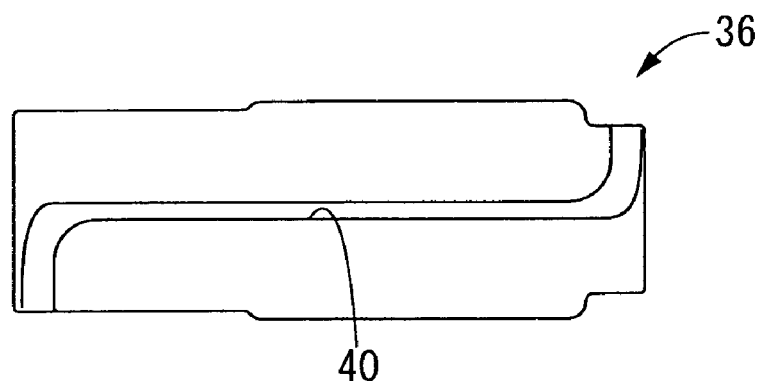
FIG. 5 is a side elevational view of a first orifice member of the suspension bushing of FIG. 1.
Figure 6:
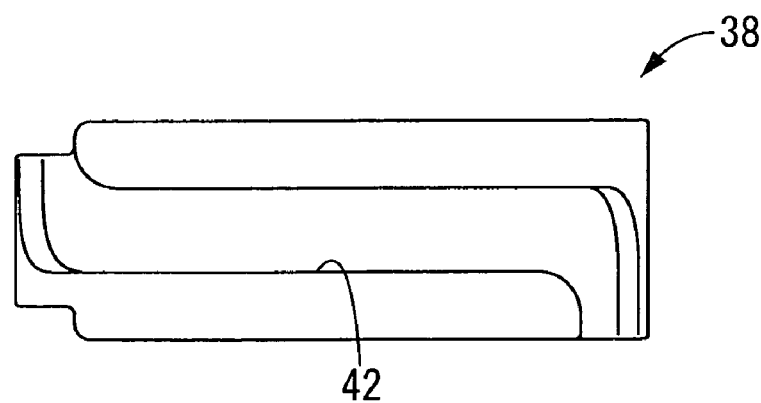
FIG. 6 is a side elevational view of a second orifice member of the suspension bushing of FIG. 1.

As depicted in FIGS. 2 to 4, by means of the main rubber elastic body 16 taking the form of the integrally vulcanization molded component 28 incorporating the intermediate sleeve 20, the first pocket portions 30a, 30b open onto the outside peripheral face of the integrally vulcanization molded component 28 through the first window portions 24a, 24b while the second pocket portions 32a, 32b open onto the outside peripheral face of the integrally vulcanization molded component 28 through the second window portions 26a, 26b.

In the axial medial section of the main rubber elastic body 16, the sections which circumferentially partition the first pocket portions 30a, 30b and the second pocket portions 32a, 32b constitute partition walls 34a, 34b, 34c and 34d. In the present embodiment, there are provided: the partition wall 34a that partitions the first pocket portion 30a and the second pocket portion 32a; the partition wall 34b that partitions the first pocket portion 30a and the second pocket portion 32b; the partition wall 34c that partitions the first pocket portion 30b and the second pocket portion 32b; and the partition wall 34d that partitions the first pocket portion 30b and the second pocket portion 32a. Each of the partition walls 34a, 34b, 34c and 34d is bonded by vulcanization to the inner shaft member 12, the stopper member 18, and the intermediate sleeve 20.

A first orifice member 36 and a second orifice member 38 each formed of synthetic resin or other rigid material are attached to the integrally vulcanization molded component 28 of the main rubber elastic body 16. As depicted in FIGS. 1 to 3 and FIG. 5, the first orifice member 36 has a curving plate shape which curves with an arcuate shape and extends a length about equal to halfway around the circumference. In the outside peripheral face of the first orifice member 36, there is formed a first slot 40 that extends a prescribed length in the circumferential direction. The first slot 40 is arranged so that one circumferential end (the right one in FIG. 5) is bent axially upwardly and opens onto the upper end face while the other circumferential end (the left one in FIG. 5) is bent axially downwardly and opens onto the lower end face.

The second orifice member 38, as depicted in FIGS. 1 to 3 and FIG. 6, has a curving plate shape similar to the first orifice member 36. The second orifice member 38 includes a second slot 42 that opens onto its outside peripheral face and extends a prescribed length in the circumferential direction. The second slot 42 has a larger width dimension than does the first slot 40 and its one circumferential end (the right one in FIG. 6) opens axially downwardly while the other circumferential end (the left one in FIG. 6) opens axially upwardly.

Figure 7:
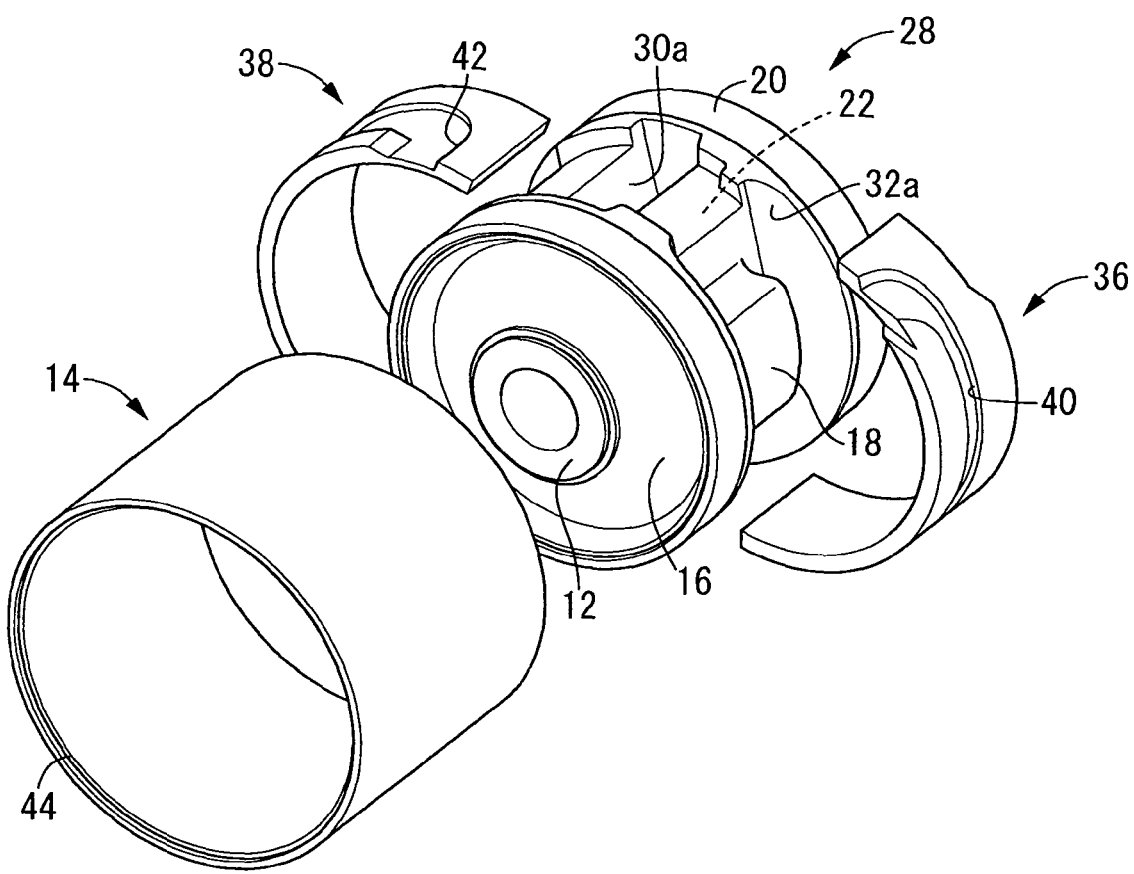
FIG. 7 is a perspective view for explaining assembly of the suspension bushing of FIG. 1.
Figure 8:
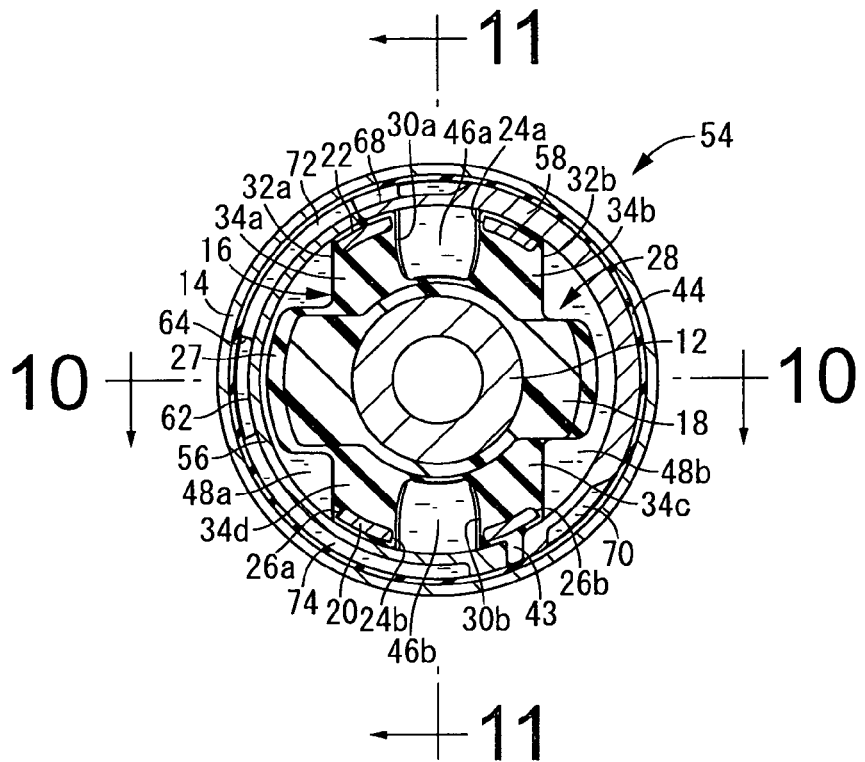
FIG. 8 is a transverse cross sectional view of an automotive suspension bushing according to a second embodiment of the present invention, taken along line 8-8 of FIG. 10.
Figure 9:
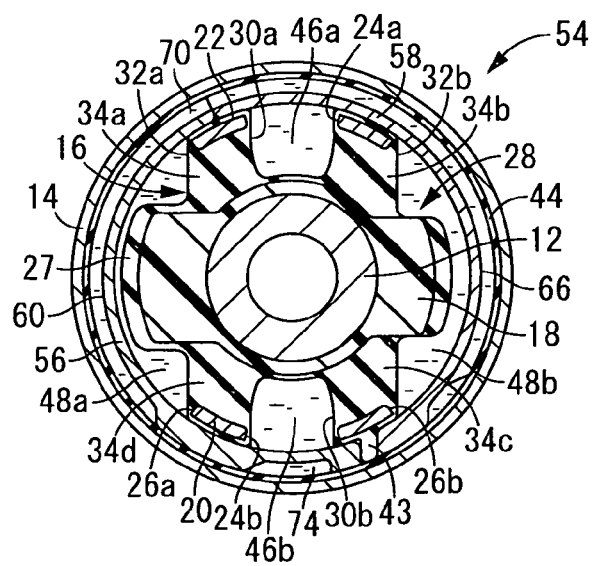
FIG. 9 is a transverse cross sectional view of the suspension bushing of FIG. 8, taken along line 9-9 of FIG. 10.
Figure 10:
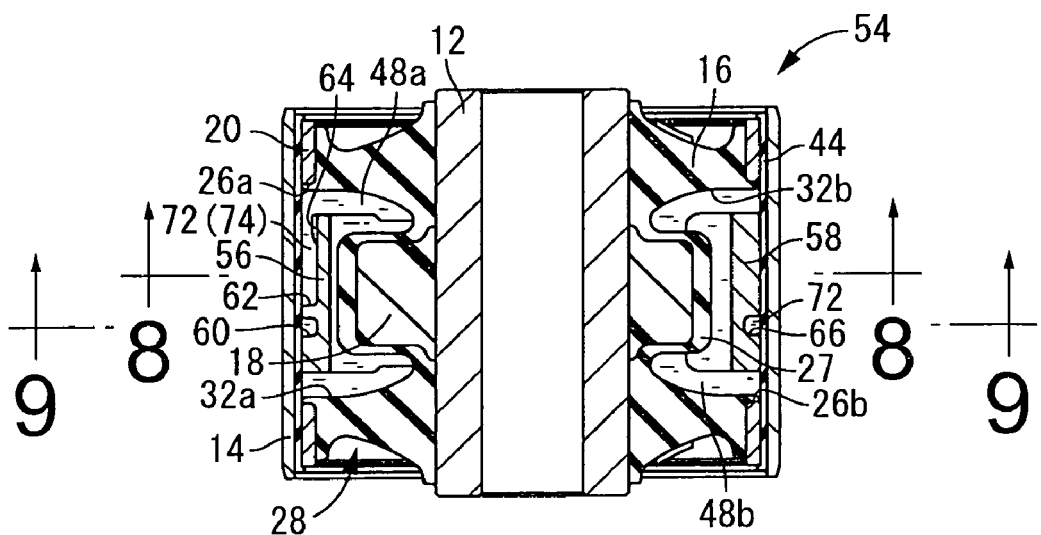
FIG. 10 is a cross sectional view taken along line 10-10 of FIG. 8.
Figure 11:
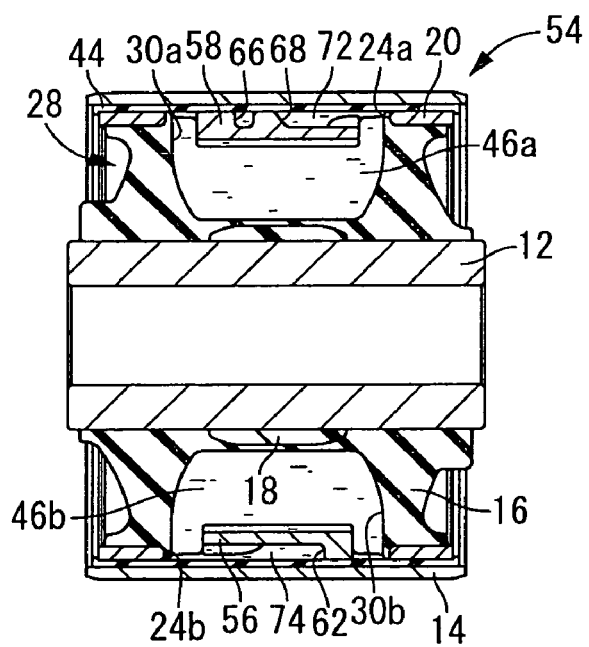
FIG. 11 is a cross sectional view taken along line 11-11 of FIG. 8.
Figure 12:
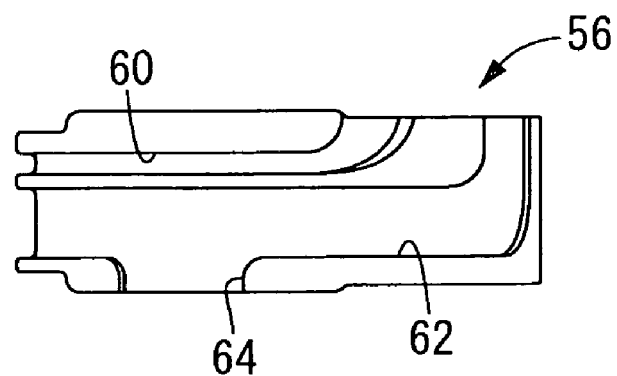
FIG. 12 is a side elevational view of a first orifice member of the suspension bushing of FIG. 8.
Figure 13:
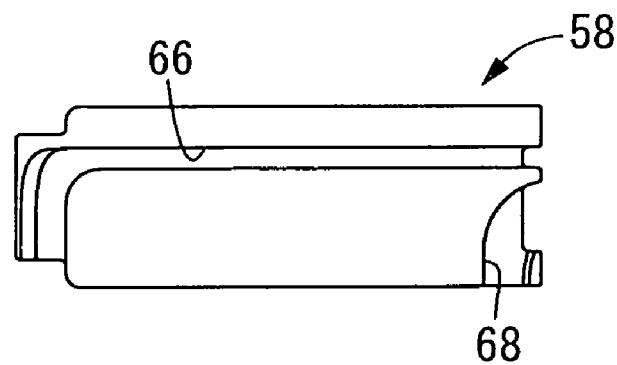
FIG. 13 is a side elevational view of a second orifice member of the suspension bushing of FIG. 8.

As depicted in FIG. 7, the first and second orifice members 36, 38 are fitted onto the mating slot 22 of the intermediate sleeve 20 from either side in one diametrical direction and mounted on the integrally vulcanization molded component 28 of the main rubber elastic body 16. One circumferential ends of the first and second orifice members 36, 38 are superposed against a cushioning rubber 43, which is integrally formed with the main rubber elastic body 16 and projects out from the outside circumferential face of the intermediate sleeve 20, from either side in the circumferential direction. Dimensional errors of the first and second orifice members 36, 38 will be allowable owing to elastic deformation of the cushioning rubber 43.

An outer cylindrical member 14 is attached to the integrally vulcanization molded component 28 of the main rubber elastic body 16 onto which the first and second orifice members 36, 38 have been mounted. The outer cylindrical member 14 has a thin, large-diameter, generally round tube shape and its inside peripheral face is covered over substantially the entire surface by a thin seal rubber layer 44. The outer cylindrical member 14 is fitted externally onto the integrally vulcanization molded component 28 onto which the first and second orifice members 36, 38 have been mounted, and then is subjected to a diameter reduction process such as 360-degree radial compression in order to be fastened fitting with the intermediate sleeve 20 of the integrally vulcanization molded component 28.

By means of the outer cylindrical member 14 being fastened to the integrally vulcanization molded component 28, the first and second pocket portions 30a, 30b and 32a, 32b that open onto the outside peripheral face through the first and second window portions 24a, 24b and 26a, 26b are covered fluid-tightly by the outer cylindrical member 14. With this arrangement, a pair of first fluid chambers 46a, 46b that are opposed to each other in one diametrical direction are formed utilizing the pair of the first pocket portions 30a, 30b while a pair of second fluid chambers 48a, 48b that are opposed to each other in another diametrical direction which is orthogonal to the opposing direction of the pair of the first fluid chambers 46a, 46b are formed utilizing the pair of the second pocket portions 32a, 32b. The walls situated on circumferentially opposite sides of the first and second fluid chambers 46a, 46b and 48a, 48b are constituted by the partition walls 34a, 34b, 34c and 34d.

A non-compressible fluid is sealed within the first and second fluid chambers 46a, 46b and 48a, 48b. As the non-compressible fluid it would be possible to use water, an alkylene glycol, a polyalkylene glycol, silicone oil, or the like. In order to effectively achieve vibration damping effect based on flow action such as resonance action of the fluid, it will be especially preferable to use a low-viscosity fluid such as water having viscosity of 0.1 Pa·s or lower.

The outer cylindrical member 14 is juxtaposed against the outside peripheral faces of the first and second orifice members 36, 38 fluid-tightly via the seal rubber layer 44, thereby covering the apertures of the first and second slots 40, 42. With this arrangement, there is formed utilizing the first slot 40 a first orifice passage 50 that interconnects the first fluid chamber 46b and the second fluid chamber 48a while there is formed utilizing the second slot 42 a second orifice passage 52 that interconnects the first fluid chamber 46a and the second fluid chamber 48b. The tuning frequency of each of the first and second orifice passages 50, 52 is set by adjusting a ratio (A/L) of passage cross sectional area (A) to passage length (L) of each of the first and second orifice passages 50, 52. In the present embodiment, the tuning frequency of the first orifice passage 50 is set to a lower frequency than the tuning frequency of the second orifice passage 52. More specifically, for example, the first orifice passage 50 is tuned so as to exhibit vibration damping effect during vibration input on the order of 15 Hz on the basis of resonance action etc. of the fluid, while the second orifice passage 52 is tuned so as to exhibit vibration damping effect during vibration input on the order of 40 Hz on the basis of resonance action etc. of the fluid.

Here, the second fluid chambers 48a, 48b have a larger dimension in the circumferential direction than do the first fluid chambers 46a, 46b. Additionally, each of base walls (the walls on the inner peripheral side) of the second fluid chambers 48a, 48b extends in the direction which coincides with the opposing direction of the pair of the first fluid chambers 46a, 46b. With this arrangement, as depicted in FIG. 1, the axial medial section of the main rubber elastic body 16 has a flattened transverse cross section that extends in the opposing direction of the pair of the first fluid chambers 46a, 46b.

Namely, in the main rubber elastic body 16, each of the partition walls 34a, 34b, 34c and 34d extends in the direction in more proximity to the opposing direction of the pair of the first fluid chambers 46a, 46b than to the opposing direction of the pair of the second fluid chambers 48a, 48b.

As viewed in the transverse cross section, the angle: $\theta_1$ formed by the opposing direction of the pair of the first fluid chambers 46a, 46b and the elastic principal axis of the partition wall 34a that extends in the opposing direction of the inner shaft member 12 and the intermediate sleeve 20 for example is smaller than the angle: $\theta_2$ formed by the opposing direction of the pair of the second fluid chambers 48a, 48b and the elastic principal axis of the partition wall 34a ($\theta_1 < \theta_2$).

That is, viewed in the transverse cross section, when imaging hypothetically a partition-wall diametrical line that connects the diametrical center point of the inner shaft member 12 and the point of intersection between the elastic principal axis of the partition wall 34a and the outer cylindrical member 14, the angle: $\theta_3$ formed by the partition-wall diametrical line and the opposing direction of the pair of the first fluid chambers 46a, 46b is smaller than the angle: $\theta_4$ formed by the partition-wall diametrical line and the opposing direction of the pair of the second fluid chambers 48a, 48b ($\theta_3 < \theta_4$).

In other words, viewed in the transverse cross section, the circumferential distance: $l_1$ between the points of intersections of the outer cylindrical member 14 and the elastic principal axes of the pair of the partition walls 34c, 34d (34a, 34b) that constitute the walls of the first fluid chamber 46b (46a) is smaller than the circumferential distance: $l_2$ between the points of intersections of the outer cylindrical member 14 and the elastic principal axes of the pair of the partition walls 34b, 34c (34a, 34d) that constitute the walls of the second fluid chamber 48b (48a) ($l_1 < l_2$).

In yet other words, in the present embodiment, the angle: $\theta_5$ formed by the elastic principal axes of the pair of the partition walls 34a, 34b (34c, 34d) that constitute the walls of the first fluid chamber 46a (46b) is set smaller than the angle: $\theta_6$ formed by the elastic principal axes of the pair of the partition walls 34b, 34c (34a, 34d) that constitute the walls of the second fluid chamber 48b (48a) ($\theta_5 < \theta_6$).

In this way, the main rubber elastic body 16 extends in the vertical direction which coincides with the opposing direction of the pair of the first fluid chambers 46a, 46b. With this arrangement, at times of vibration input in the vertical direction, the inner shaft member 12 and the outer cylindrical member 14 will experience relative displacement in the vertical direction, whereby the main rubber elastic body 16 will be subjected to dominant compressive deformation in the diametrical direction. On the other hand, at times of vibration input in the lateral direction, the inner shaft member 12 and the outer cylindrical member 14 will experience relative displacement in the lateral direction, whereby the main rubber elastic body 16 will be subjected to dominant shear deformation in the diametrical direction. As a result, in the suspension bushing 10, spring rigidity as measured in one diametrical direction in which the pair of the first fluid chambers 46a, 46b are opposed to each other is set greater than spring rigidity as measured in another diametrical direction in which the pair of the second fluid chambers 48a, 48b are opposed to each other.

In the present embodiment, since the main rubber elastic body 16 extends in the diametrical direction which is in proximity to the opposing direction of the pair of the first fluid chambers 46a, 46b, each of the partition walls 34a, 34b, 34c and 34d extends in the one diametrical direction in which the pair of the first fluid chambers 46a, 46b are opposed to each other.

Additionally, the first fluid chambers 46a, 46b have a circumferential dimension smaller than the diameter of the inner shaft member 12. With this arrangement, in projection view in the diametrical direction in which the pair of the first fluid chambers 46a, 46b are opposed to each other, the entire first fluid chambers 46a, 46b overlap the inner shaft member 12. Meanwhile, the second fluid chambers 48a, 48b have a width dimension (a maximum dimension in the opposing direction of the first fluid chambers 46a, 46b) larger than the diameter of the inner shaft member 12. With this arrangement, in projection view in the diametrical direction in which the pair of the second fluid chambers 48a, 48b are opposed to each other, both circumferential ends in each pair of the second fluid chambers 48a, 48b are situated jutting out on circumferentially opposite sides of the inner shaft member 12, while being away from the inner shaft member 12.

Moreover, in the opposing direction of the first fluid chambers 46a, 46b, a part of the partition walls 34a, 34b, 34c and 34d overlaps the inner shaft member 12 along the entire diametrical length thereof In other words, in the opposing direction of the first fluid chambers 46a, 46b, a part of the outside peripheral edges of the partition walls 34a, 34b, 34c and 34d overlaps the inner shaft member 12.

Furthermore, the stopper member 18 installed on the inner shaft member 12 projects within the pair of the second fluid chambers 48a, 48b in the opposing direction of the pair of the second fluid chambers 48a, 48b which coincides with the minor axis direction of the main rubber elastic body 16 while being disposed spaced apart diametrically inward from and in opposition to the outer cylindrical member 14. At times of vibration input in the lateral direction, the stopper member 18 fastened around the inner shaft member 12 will come into abutment against the outer cylindrical member 14 via the orifice members 36, 38 thereby providing a stopper mechanism for limiting the amount of relative displacement of the inner shaft member 12 and the outer cylindrical member 14 in the lateral direction.

In addition, in projection view in the diametrical direction in which the pair of the first fluid chambers 46a, 46b are opposed to each other, the stopper member 18 projects out circumferentially outward of the main rubber elastic body 16. With this arrangement, in projection view in the diametrical direction in which the pair of the first fluid chambers 46a, 46b are opposed to each other, the axial center sections of the partition walls 34a, 34b, 34c and 34d of the main rubber elastic body 16 overlap the stopper member 18 along the entire length thereof in the diametrical direction in which the pair of the second fluid chambers 48a, 48b are opposed to each other.

In the automotive suspension bushing 10 of this construction according to the present embodiment, there is formed the first orifice passage 50 that interconnects the first fluid chamber 46b and the second fluid chamber 48a while there is formed the second orifice passage 52 that interconnects the first fluid chamber 46a and the second fluid chamber 48b, and the first orifice passage 50 and the second orifice passage 52 are tuned to different frequencies from each other. Accordingly, it is possible to attain excellent vibration damping action based on the flow action of a fluid against several types of vibration having different frequencies.

Moreover, in the present embodiment, in projection view in the vertical direction, the entire first fluid chambers 46a, 46b overlap the inner shaft member 12. Therefore, it is possible to ensure a large effective piston surface area of the first fluid chambers 46a, 46b, so that at times of vibration input in the vertical direction, fluid flow will be efficiently produced through the orifice passages 50, 52. As a result, it is possible to effectively attain vibration damping action on the basis of flow action of a fluid, thereby realizing excellent vibration damping capabilities.

In addition, the partition walls 34a, 34b, 34c and 34d of the main rubber elastic body 16 are formed so as to extend in the direction in more proximity to the opposing direction of the pair of the first fluid chambers 46a, 46b (the vertical direction) than to the opposing direction of the pair of the second fluid chambers 48a, 48b (the lateral direction). With this arrangement, it is possible to set a larger difference between the spring rigidity as measured in the vertical direction and the spring rigidity as measured in the lateral direction, thereby making it possible to advantageously realize intended vibration damping characteristics in both directions of the vehicle vertical direction and the vehicle lateral direction.

Furthermore, in the present embodiment, each of the partition walls 34a, 34b, 34c and 34d is arranged so that its first fluid chambers 46a, 46b-side end is interposed between vertically opposed faces of the inner shaft member 12 and the intermediate sleeve 20, being adapted to undergo compressive deformation across the entire length thereof between the opposed faces of the inner shaft member 12 and the intermediate sleeve 20 at times of vibration input in the vertical direction. This allows to set a great spring rigidity as measured in the vertical direction, making it possible to set a larger difference between the spring rigidity as measured in the vertical direction and the spring rigidity as measured in the lateral direction.

Moreover, in the present embodiment, the axial medial sections of the partition walls 34a, 34b, 34c and 34d are partially and over substantially entire length thereof in the lateral direction in FIG. 1 interposed between the opposed faces of the stopper member 18 installed around the inner shaft member 12 and the intermediate sleeve 20. Therefore, in the vertical direction, the partition walls 34a, 34b, 34c and 34d will be compressed between rigid members over a wider area, making it possible to more advantageously set a greater spring rigidity as measured in the vertical direction. As a result, intended vibration damping characteristics are able to be realized more effectively. Furthermore, in the present embodiment, in the axial center section, each of the partition walls 34a, 34b, 34c and 34d overlaps over the substantially entire length thereof in the lateral direction the inner shaft member 12 and the stopper member 18 in projection view in the vertical direction. Consequently, stress acting on the partition walls 34a, 34b, 34c and 34d is small, advantageously being capable of affording durability.

Meanwhile, in the lateral direction, the pair of the second fluid chambers 48a, 48b are formed so as to jut out on vertically opposite sides of the inner shaft member 12. Therefore, at times of vibration input in the lateral direction, shear deformation of the partition walls 34a, 34b, 34c and 34d will be advantageously allowed, whereby it is possible to more effectively set a small spring rigidity as measured in the lateral direction as well as to ensure a large effective piston surface area of the second fluid chambers 48a, 48b, making it possible to more advantageously attain vibration damping action on the basis of flow action of a fluid.

Furthermore, the stopper member 18 will limit the amount of relative displacement of the inner shaft member 12 and the outer cylindrical member 14 in the lateral direction, thereby avoiding damage to the partition walls 34a, 34b, 34c and 34d of the main rubber elastic body 16 due to an excess amount of relative displacement between the inner shaft member 12 and the outer cylindrical member 14 in the lateral direction. Accordingly, it is possible to set a small spring rigidity to the partition walls 34a, 34b, 34c and 34d while sufficiently ensuring durability of the partition walls 34a, 34b, 34c and 34d.

Also, base wall faces of the second fluid chambers 48a, 48b are flat surfaces that extend parallel with respect to the opposing direction of the pair of the first fluid chambers 46a, 46b while the stopper member 18 is provided so as to projects within the pair of the second fluid chambers 48a, 48b. Consequently, it is possible to mold by vulcanization the main rubber elastic body 16 by using two molding dies adapted to be mated together in the vertical direction, making it possible to decrease the number of molding dies. Moreover, it is possible to avoid any undercuts in the second fluid chambers 48a, 48b of the vulcanization molded component so that the main rubber elastic body 16 will be readily removed from the molding dies.

Referring next to FIGS. 8 through 11, there is depicted an automotive suspension bushing 54 according to a second embodiment of a fluid-filled cylindrical vibration-damping device constructed in accordance with the present invention. The suspension bushing 54 has a structure including an integrally vulcanization molded component 28 of a main rubber elastic body 16 with a first orifice member 56 and a second orifice member 58 each formed of metal attached thereto. In the following description, components and parts that are substantially identical with those in the preceding first embodiment will be assigned like symbols and not described in any detail.

As depicted in FIGS. 8 to 12, the first orifice member 56 has a curving plate shape which curves with an arcuate shape and extends a length about equal to halfway around the circumference. In the outside peripheral face of the first orifice member 56, a third slot 60 and a fourth slot 62 are formed axially apart from each other and extend in the circumferential direction.

The third slot 60 extends in the circumferential direction and is arranged so that one end is bent axially upwardly at the medial section of the first orifice member 56 and opens onto the upper end face of the first orifice member 56 while the other end opens onto the circumferential end face of the first orifice member 56.

The fourth slot 62 extends in the circumferential direction like the third slot 60 and has a larger width dimension than does the third slot 60. The fourth slot 62 is arranged so that one end is bent upwardly in proximity to one circumferential end of the first orifice member 56 (the right end in FIG. 12) and opens onto the upper end face of the first orifice member 56 while the other end opens onto the circumferential end face of the first orifice member 56. In addition, in the circumferential medial section of the fourth slot 62, there is formed a connecting slot 64 that extends downwardly and opens onto the lower end face of the first orifice member 56.

Meanwhile, the second orifice member 58, as depicted in FIGS. 8 to 11 and FIG. 13, has a curving plate shape of semi-circular arc similar to the first orifice member 56. There are formed a fifth slot 66 and a sixth slot 68 opening onto the outside peripheral face of the second orifice member 58.

The fifth slot 66 extends in the circumferential direction with a width dimension approximately equal to that of the third slot 60 and is arranged so that one end opens onto the circumferential end face of the second orifice member 58 while the other end is bent downwardly in proximity to the other circumferential end of the second orifice member 58 (the left end in FIG. 13) and opens onto the lower end face of the second orifice member 58.

The sixth slot 68 extends in the circumferential direction with a width dimension approximately equal to that of the fourth slot 62 and is arranged so that one circumferential end opens onto the circumferential end face of the second orifice member 58 while the other end is bent downwardly in proximity to one circumferential end of the second orifice member 58 (the right end in FIG. 13) and opens onto the lower end face of the second orifice member 58.

Figure 14:
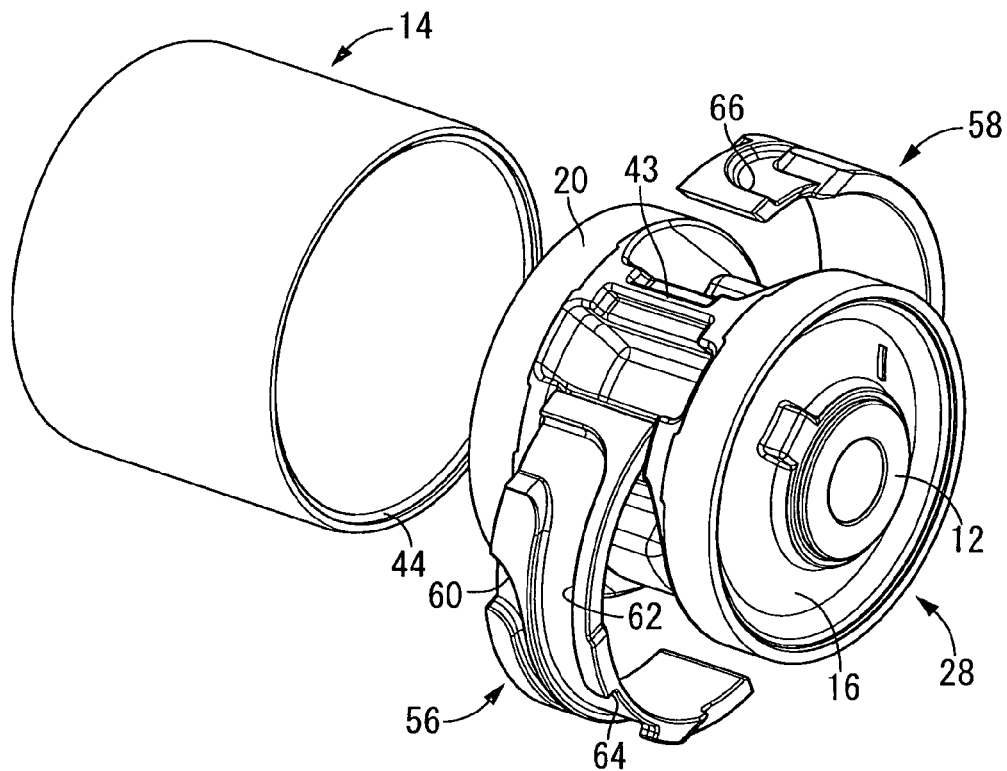
FIG. 14 is a perspective view for explaining assembly of the suspension bushing of FIG. 8.

As depicted in FIG. 14, the first and second orifice members 56, 58 are attached with the integrally vulcanization molded component 28 of the main rubber elastic body 16 sandwiched therebetween in the diametrical direction. The first orifice member 56 is positioned so as to straddle the first fluid chamber 46b and the second fluid chamber 48a in the circumferential direction while the second orifice member 58 is positioned so as to straddle the first fluid chamber 46a and the second fluid chamber 48b in the circumferential direction.

With the first and second orifice members 56, 58 installed in the integrally vulcanization molded component 28, the third slot 60 of the first orifice member 56 and the fifth slot 66 of the second orifice member 58 are connected in the circumferential direction so as to form a first circumferential groove while the fourth slot 62 of the first orifice member 56 and the sixth slot 68 of the second orifice member 58 are connected in the circumferential direction so as to form a second circumferential groove. The outer cylindrical member 14 fluid-tightly covers the outside peripheral apertures of the first circumferential groove and the second circumferential groove thereby forming two tunnel-like passages that extends a prescribed length in the circumferential direction.

One circumferential end of the first circumferential groove communicates with the second fluid chamber 48b while the other circumferential end of the first circumferential groove communicates with the second fluid chamber 48a. With this arrangement, there is formed utilizing the first circumferential groove a third orifice passage 70 that interconnects the second fluid chamber 48a and the second fluid chamber 48b.

Meanwhile, with respect to the second circumferential groove, whereas its generally circumferential center section communicates with the second fluid chamber 48a through the connecting slot 64, one circumferential end thereof communicates with the first fluid chamber 46a while the other circumferential end thereof communicates with the first fluid chamber 46b. With this arrangement, there are formed utilizing the second circumferential groove a fourth orifice passage 72 that interconnects the second fluid chamber 48a and the first fluid chamber 46a as well as a fifth orifice passage 74 that interconnects the second fluid chamber 48a and the first fluid chamber 46b. The fourth and fifth orifice passages 72, 74 are tuned to a higher frequency than the third orifice passage 70. In the present embodiment, the fourth orifice passage 72 and the fifth orifice passage 74 are tuned to the same frequency. However, the fourth and fifth orifice passages 72, 74 may alternatively be tuned to different frequencies from each other so as to exhibit vibration damping action against vibrations over a wider frequency range.

With the suspension bushing 54 of this construction installed in a vehicle, when low-frequency, large-amplitude vibration is input in one diametrical direction in which the pair of the second fluid chambers 48a, 48b are opposed to each other, fluid flow will be produced between the pair of the second fluid chambers 48a, 48b through the third orifice passage 70. Accordingly, it is possible to attain vibration damping action (high attenuating or damping action) on the basis of flow action of a fluid.

Further, when high-frequency, small-amplitude vibration is input in one diametrical direction in which the pair of the second fluid chambers 48a, 48b are opposed to each other, the third orifice passage 70 that is tuned to lower frequency than that of the input vibration will substantially be obstructed. Then fluid flow will be produced among the second fluid chamber 48a and the pair of the first fluid chambers 46a, 46b through the fourth and fifth orifice passages 72, 74, thereby exhibiting vibration damping action (low dynamic spring action) on the basis of flow action of a fluid.

Figure 15:
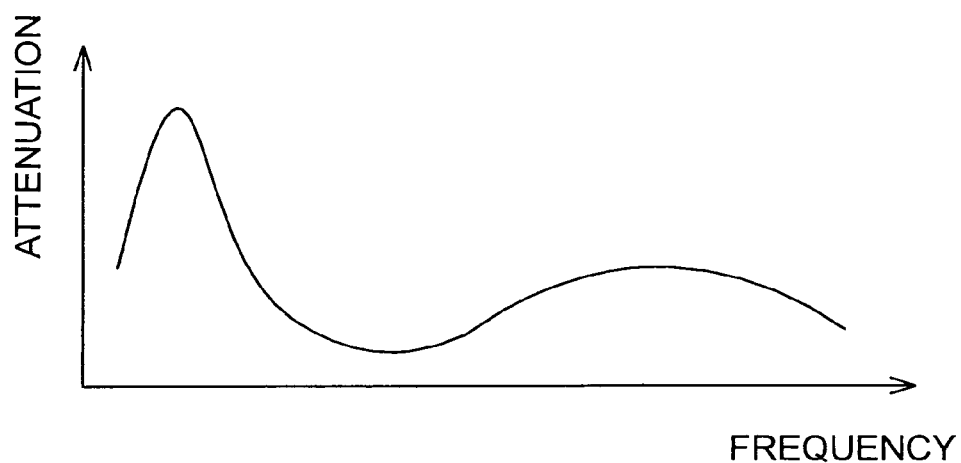
FIG. 15 is a graph demonstrating vibration damping characteristics of the suspension bushing of FIG. 8 in the opposing direction of a pair of second fluid chambers.

It will be apparent from the measurements of vibration damping characteristics shown in FIG. 15 that the suspension bushing 54 is able to effectively exhibit both of vibration damping action against low-frequency vibration and vibration damping action against high-frequency vibration in the axis-perpendicular direction in which the pair of the second fluid chambers 48a, 48b are opposed to each other.

Additionally, with respect to vibrations input in one diametrical direction in which the pair of the first fluid chambers 46a, 46b are opposed to each other, fluid flow will be produced among the second fluid chamber 48a, the first fluid chamber 46a, and the first fluid chamber 46b through the fourth orifice passage 72 and the fifth orifice passage 74, thereby exhibiting an intended vibration damping action.

Moreover, in the suspension bushing 54, when static load is input in one diametrical direction in which the pair of the second fluid chambers 48a, 48b are opposed to each other during installation in a vehicle, the sealed fluid will smoothly flow between the pair of the second fluid chambers 48a, 48b, so that static spring constant in the diametrical direction will be kept low.

Specifically, the second fluid chamber 48a and the second fluid chamber 48b are situated so as to be opposed to each other in one diametrical direction. With this arrangement, when static load is input in the opposing direction of the second fluid chamber 48a and the second fluid chamber 48b, opposing positive/negative pressure fluctuations which have an equal absolute value are induced between the second fluid chamber 48a and the second fluid chamber 48b. In addition, the second fluid chamber 48a and the second fluid chamber 48b are connected with each other through the third orifice passage 70. Therefore, when relative pressure fluctuations are produced between the second fluid chamber 48a and the second fluid chamber 48b, fluid flow through the third orifice passage 70 will rapidly be induced. Accordingly, at times of static load acting in the axis-perpendicular direction, rise of static spring constant caused by lack of amount of fluid flow will be prevented whereby the static spring constant will be kept low.

Referring now to FIGS. 16 through 19, there is depicted an automotive suspension bushing 76 according to a third embodiment of a fluid-filled cylindrical vibration-damping device constructed in accordance with the present invention. The suspension bushing 76 has a structure including an integrally vulcanization molded component 78 of a main rubber elastic body 16 with a first half orifice body 80 and a second half orifice body 82 each formed of metal material such as aluminum die casting attached thereto.

The integrally vulcanization molded component 78, as depicted in FIGS. 16 to 20, is formed by means of elastically connecting an inner shaft member 12 and an intermediate sleeve 20 with each other by the main rubber elastic body 16. Moreover, the integrally vulcanization molded component 78 has a structure that eliminates the stopper member 18 which is included in the integrally vulcanization molded component 28 in the preceding first and second embodiments. A cushion rubber layer 83 integrally formed with the main rubber elastic body 16 is bonded by vulcanization directly to the inner shaft member 12 so as to cover its outside peripheral face.

Figure 16:
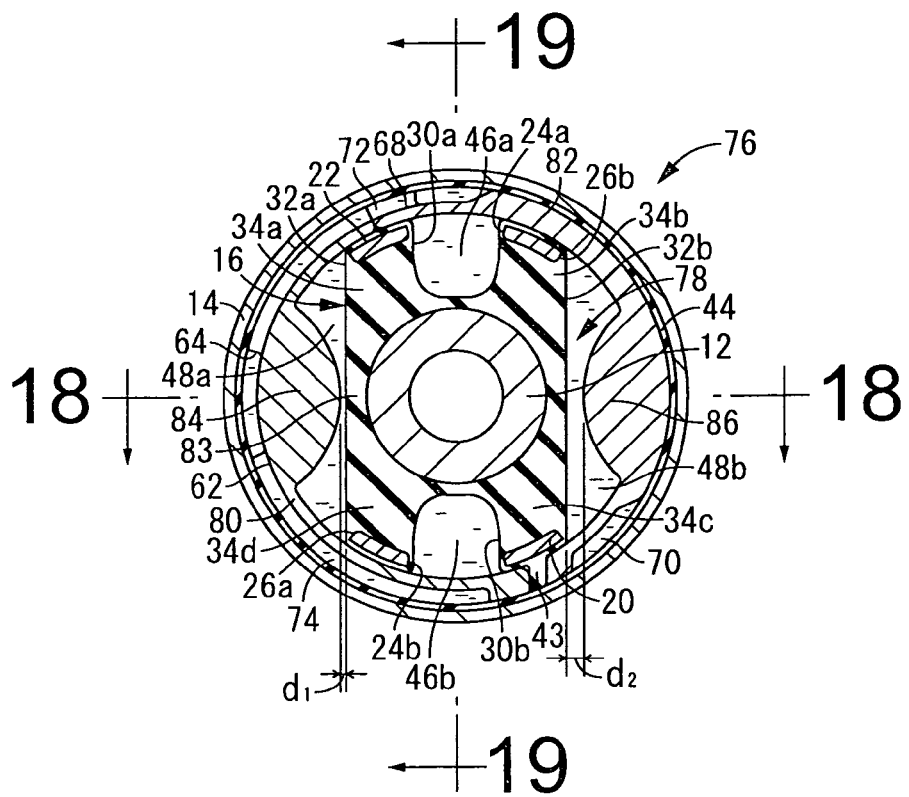
FIG. 16 is a transverse cross sectional view of an automotive suspension bushing according to a third embodiment of the present invention, taken along line 16-16 of FIG. 18.
Figure 17:
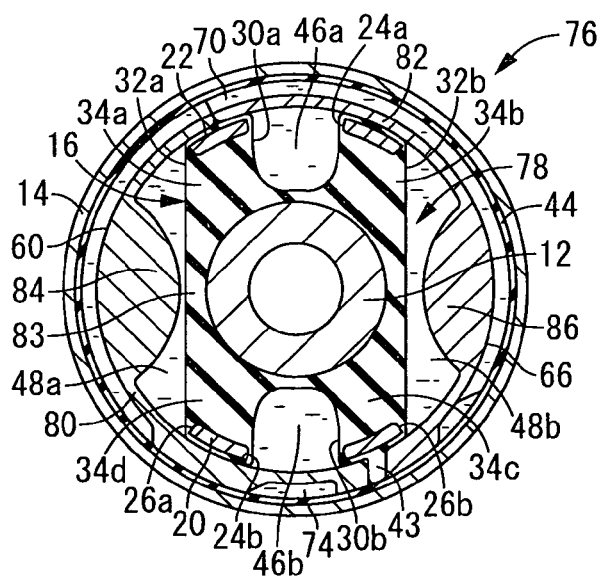
FIG. 17 is a transverse cross sectional view of the suspension bushing of FIG. 16, taken along line 17-17 of FIG. 18.
Figure 18:
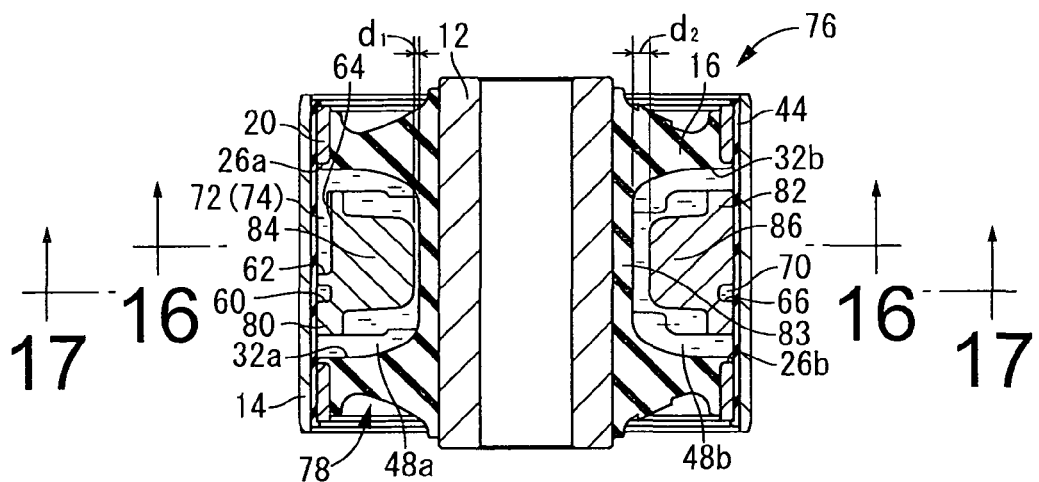
FIG. 18 is a cross sectional view taken along line 18-18 of FIG. 16.
Figure 19:
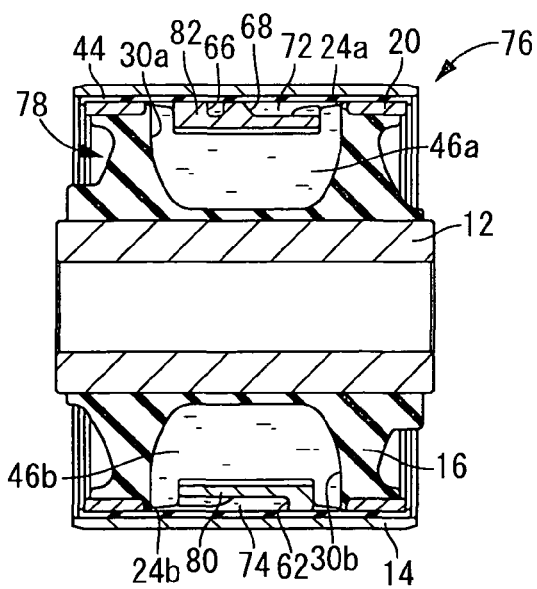
FIG. 19 is a cross sectional view taken along line 19-19 of FIG. 16.
Figure 20:
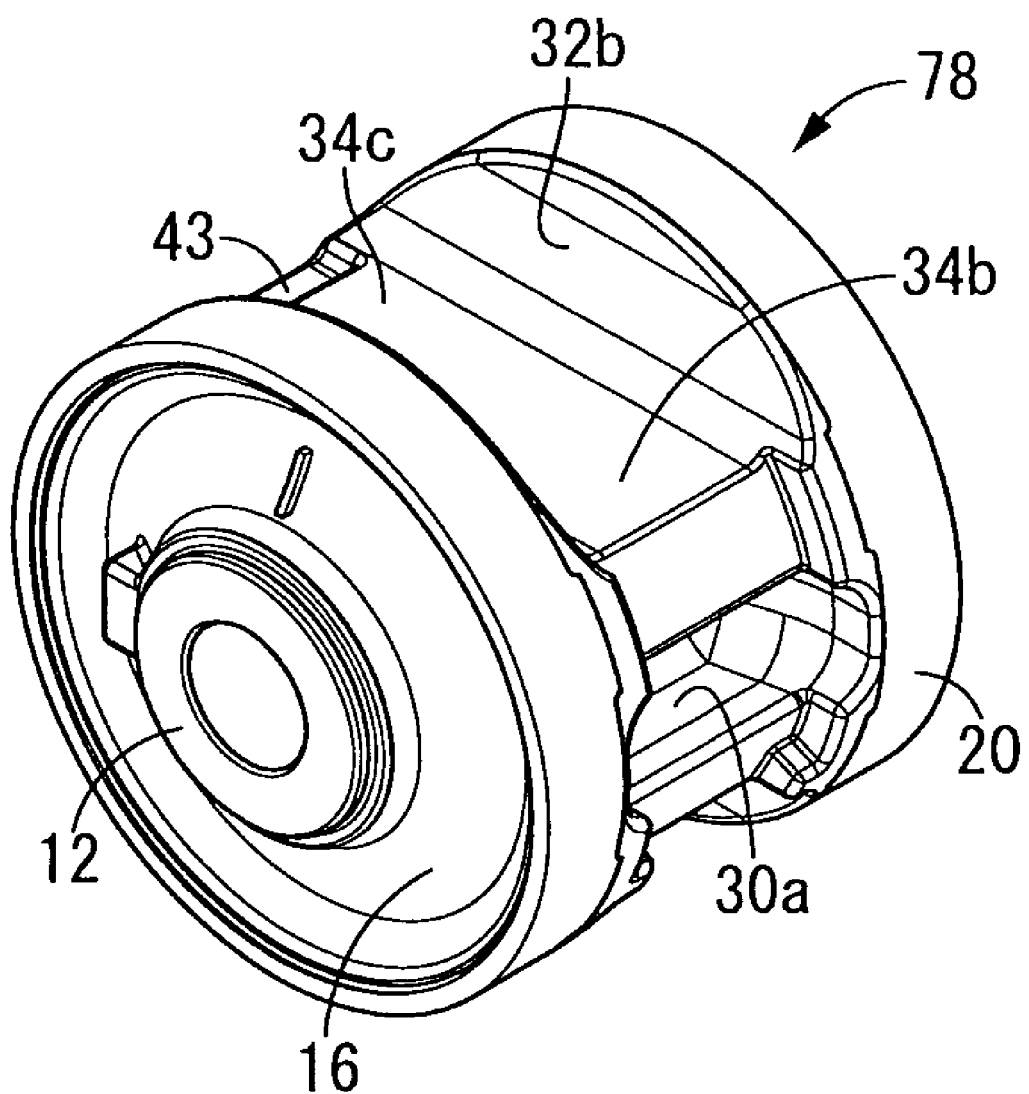
FIG. 20 is a perspective view of an integrally vulcanization molded component of the suspension bushing of FIG. 16.
Figure 21:
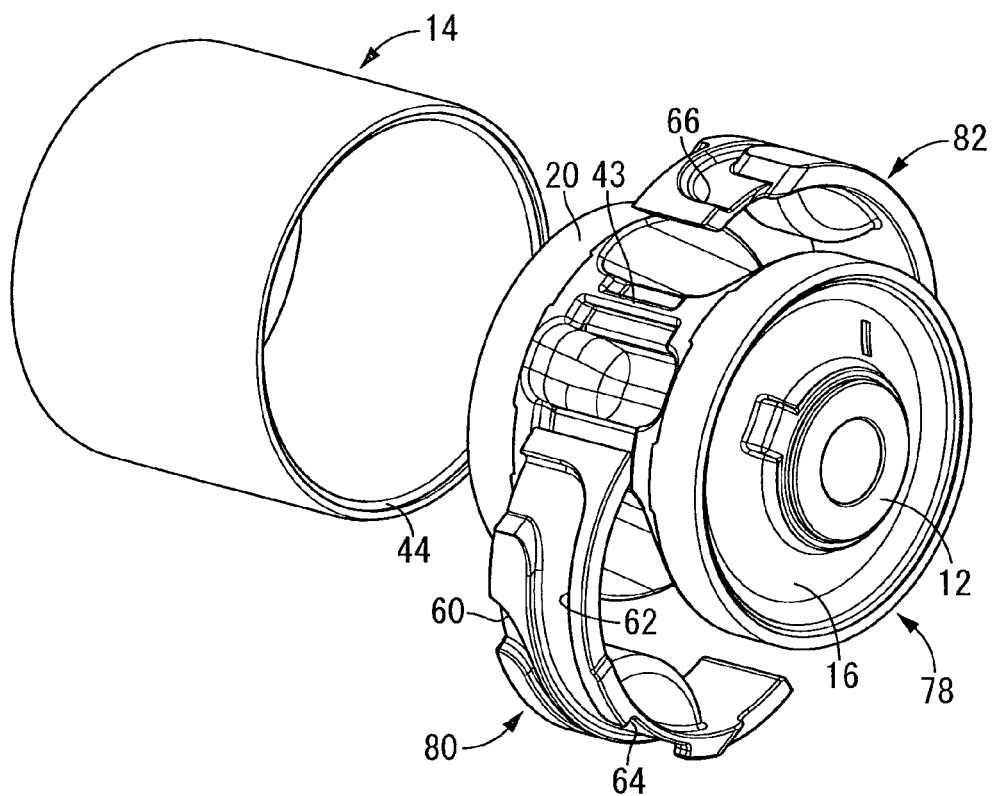
FIG. 21 is a perspective view for explaining assembly of the suspension bushing of FIG. 16.

The first half orifice body 80 has a substantially identical structure with the first orifice member 56 in the preceding second embodiment, and as depicted in FIGS. 16 to 18, in the circumferentially medial section of the first half orifice body 80 there is integrally formed a first stopper projection 84 that projects diametrically inward. The first stopper projection 84 projects peripherally inward from the widthwise center section of the first half orifice body 80 and its projecting distal end face is a curved convex face of generally arcuate shape.

Meanwhile, the second half orifice body 82 has a substantially identical structure with the second orifice member 58 in the preceding second embodiment, and in the circumferentially medial section of the second half orifice body 82 there is integrally formed a second stopper projection 86 that projects diametrically inward. The second stopper projection 86 projects peripherally inward from the widthwise center section of the second half orifice body 82 and its projecting distal end face is a curved convex face of generally arcuate shape. The first stopper projection 84 projects peripherally inward with a greater projecting height than does the second stopper projection 86. However, the projecting heights of the first stopper projection 84 and the second stopper projection 86 may alternatively be substantially equal to each other.

Like the first and second orifice members 56, 58 in the preceding second embodiment, the first and second half orifice bodies 80, 82 are attached with the integrally vulcanization molded component 78 of the main rubber elastic body 16 sandwiched therebetween in the diametrical direction, thereby defining an orifice forming member of generally round tubular shape as a whole. By means of the outer cylindrical member 14 being fastened fitting with the integrally vulcanization molded component 78, the outer cylindrical member 14 is superposed against the outside peripheral faces of the first and second half orifice bodies 80, 82. With this arrangement, a first circumferential groove that opens onto the outside peripheral face of the first half orifice body 80 and a second circumferential groove that opens onto the outside peripheral face of the second half orifice body 82 will each be fluid-tightly covered, thereby forming third, fourth, and fifth orifice passages 70, 72, and 74 as in the preceding second embodiment.

By means of the first half orifice body 80 being mounted onto the integrally vulcanization molded component 78, the first stopper projection 84 projects within the second fluid chamber 48a so as to be situated in opposition to the inner shaft member 12 with a given spacing therebetween in one diametrical direction in which the pair of the second fluid chambers 48a, 48b are opposed to each other. Also, by means of the second half orifice body 82 being mounted onto the integrally vulcanization molded component 78, the second stopper projection 86 projects within the second fluid chamber 48b so as to be situated in opposition to the inner shaft member 12 with a given spacing therebetween in one diametrical direction in which the pair of the second fluid chambers 48a, 48b are opposed to each other. Specifically, the first stopper projection 84 and second stopper projection 86 are situated on diametrically opposite sides of the inner shaft member 12 within the second fluid chambers 48a, 48b while being situated in opposition to the cushion rubber layer 83 that is bonded by vulcanization to the inner shaft member 12. With this arrangement, a stopper mechanism for limiting the amount of relative displacement of the inner shaft member 12 and the outer cylindrical member 14 in the opposing direction of the second fluid chambers 48a, 48b is realized by means of the first and second stopper projections 84, 86 projecting from the outer cylindrical member 14 side toward the inner shaft member 12 side coming into abutment against the inner shaft member 12.

Since the projecting height of the first stopper projection 84 and the projecting height of the second stopper projection 86 are different from each other, the distance: $d_1$ separating the first stopper projection 84 from the cushion rubber layer 83 is smaller than the distance: $d_2$ separating the second stopper projection 86 from the cushion rubber layer 83. When the suspension bushing 76 is installed in a vehicle, static load is input in the opposing direction of the pair of the second fluid chambers 48a, 48b, whereby the distance between the first stopper projection 84 and the inner shaft member 12 becomes substantially equal to the distance between the second stopper projection 86 and the inner shaft member 12. However, it would also be possible for example that, even with the suspension bushing 76 installed in a vehicle, the distances: $d_1$ and $d_2$ are set different from each other so as to arrange characteristics of the suspension to be different in the vehicle front-back direction.

In the automotive suspension bushing 76 of this construction, it is possible to ensure larger free length of the main rubber elastic body 16 in comparison with the constructions according to the preceding first and second embodiments in which the stopper member 18 is mounted onto the inner shaft member 12. Therefore, the main rubber elastic body 16 will be prevented from being damaged by cracking or the like due to stress concentration while the stopper mechanism limits the amount of relative displacement of the inner shaft member 12 and the outer cylindrical member 14, thereby realizing improvement of durability.

Moreover, the main rubber elastic body 16 covers the surface of the inner shaft member 12, whereby the cushion rubber layer 83 defined by a part of the main rubber elastic body 16 is interposed between the inner shaft member 12 and the first and second stopper projections 84, 86. With this arrangement, the stopper action afforded by abutment of the inner shaft member 12 and the first and second stopper projections 84, 86 will be exhibited in cushioned fashion by elastic deformation of the cushion rubber layer 83, and reduced striking noise or impact can be afforded during abutment.

Furthermore, each of the projecting distal end faces of the first and second stopper projections 84, 86 is an arcuate convex face with decreasing circumferential dimension towards the projecting distal end face side. Therefore, each abutting surface area between the inner shaft member 12 and the first and second stopper projections 84, 86 will be made small thereby ameliorating impact during initial contact phase. In addition, each abutted face of the inner shaft member 12 with respect to the first and second stopper projections 84, 86 is covered by the cushion rubber layer 83 formed of rubber elastic body. Accordingly, as the amount of relative displacement of the inner shaft member 12 and the outer cylindrical member 14 becomes larger, the each abutting surface area of the first and second stopper projections 84, 86 becomes larger so that stopper action will be reliably attained.

While the present invention has been described in detail in terms of certain preferred embodiments, it is to be understood that the invention is by no means limited to the specific disclosure of the illustrated embodiments. For example, combinations of fluid chambers interconnected by a certain orifice passage are not limited to those illustrated in the preceding first through third embodiments. As a specific example it is also possible that in addition to one orifice passage that connects the second fluid chamber 48a and the first fluid chamber 46a with each other and another orifice passage that connects the second fluid chamber 48b and the first fluid chamber 46b with each other, there may be formed yet another orifice passage that connects the second fluid chamber 48a and the second fluid chamber 48b with each other. In cases where a plurality of orifice passages are formed, the plurality of orifice passages are not necessarily be tuned to the same frequency, but it would also be possible, for example, to tune the third, fourth, and fifth orifice passages 70, 72, and 74 to different frequencies from one another. With this arrangement, effective vibration damping action against vibrations over a wider frequency range will be attained.

Figure 22:
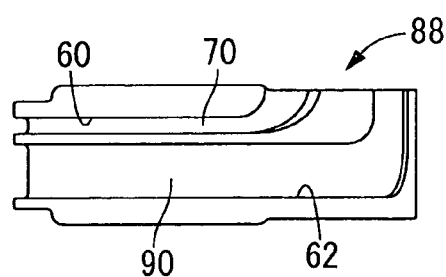
FIG. 22 is a side elevational view of a first orifice member of an automotive suspension bushing according to another embodiment of the present invention.
Figure 23A:
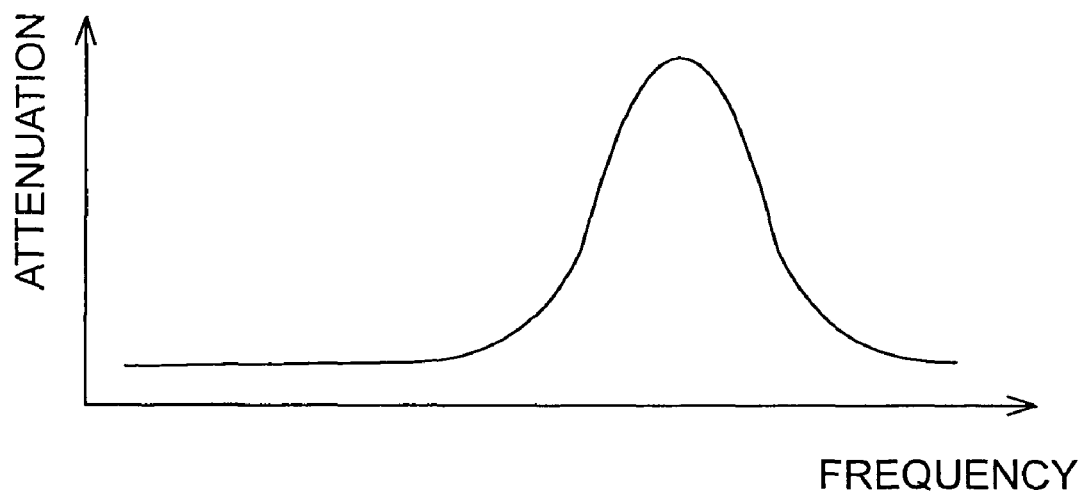
FIGS. 23A and 23B are graphs demonstrating vibration damping characteristics of the suspension bushing of FIG. 22.
Figure 23B:
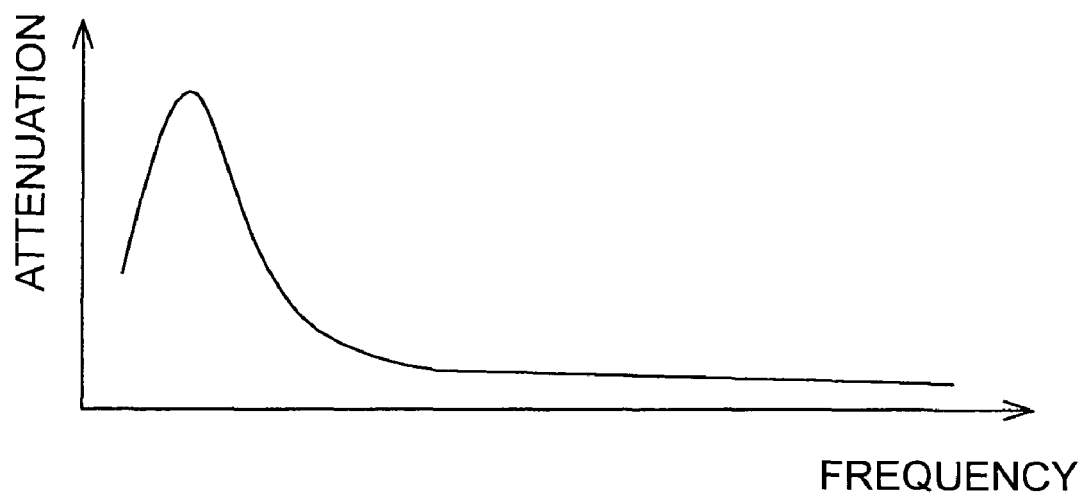

In the automotive suspension bushing 54 of construction according to the preceding second embodiment, it would also be acceptable to employ a first orifice member 88 as depicted in FIG. 22 in place of the first orifice member 56. The first orifice member 88 has a structure equivalent to eliminating the connecting slot 64 in the first orifice member 56 that was shown in the preceding second embodiment. By employing the first orifice member 88, there are formed serving as orifice passages a third orifice passage 70 that interconnects the pair of the second fluid chambers 48*a*, 48*b* and a sixth orifice passage 90 that interconnects the pair of the first fluid chambers 46*a*, 46*b*. The orifice passages of the above construction are also able to keep static spring constant low in the diametrical direction in which the pair of the second fluid chambers 48*a*, 48*b* are opposed to each other, as in the preceding second and third embodiments. Moreover, since there are formed passages independent of each other in two diametrical directions orthogonal to each other, effective vibration damping action against high-frequency vibration input in the opposing direction of the pair of the first fluid chambers 46*a*, 46*b* will be exhibited as shown in FIG. 23A while effective vibration damping action against low-frequency vibration input in the opposing direction of the pair of the second fluid chambers 48*a*, 48*b* will be exhibited as shown in FIG. 23B.

In the preceding second and third embodiments, the fourth orifice passage 72 and the fifth orifice passage 74 are formed as passages such that their ends of the second fluid chamber 48*a* side are shared with each other. However, the fourth orifice passage and the fifth orifice passage may alternatively be formed as passages completely independent of each other.

In the preceding first and second embodiments, the outside peripheral face projections are defined by the stopper member 18 that is a separate element from the inner shaft member 12 and is mounted thereto. However, it would also be possible for example that the axial medial section of the inner shaft member 12 projects towards opposite sides in one diametrical direction so as to provide outside peripheral face projections integrally formed with the inner shaft member 12.

While the above embodiments described a specific example of the present invention implemented in an automotive suspension bushing, the present invention is not limited to suspension bushings only, and is adaptable to implementation in stabilizer bushings or the like. Furthermore, the present invention may also be implemented, for example, in fluid-filled cylindrical vibration-damping devices for use in various non-automotive applications such as train cars or bicycles.

What is claimed is:

1. A fluid-filled cylindrical vibration-damping device comprising:
an inner shaft member;
an outer cylindrical member spaced apart peripherally outward from the inner shaft member;
a main rubber elastic body elastically connecting the inner shaft member and the outer cylindrical member with each other;
a plurality of pocket portions provided in the main rubber elastic body so as to open onto an outer peripheral face of the main rubber elastic body;
a plurality of fluid chambers defined by covering the pocket portions with the outer cylindrical member each filled with a non-compressible fluid;
at least one orifice passage connecting the plurality of fluid chambers with one another, wherein:

the plurality of fluid chambers comprise a pair of first fluid chambers opposed to each other in a first diametric direction with the inner shaft member being interposed therebetween and a pair of second fluid chambers opposed to each other in a second diametric direction orthogonal to the first diametric direction; and partition walls that circumferentially partition the first fluid chambers and the second fluid chambers respectively, each of the partition walls extending in a direction in more proximity to the first diametric direction in which the pair of the first fluid chambers are opposed to each other than to the second diametric direction in which the pair of the second fluid chambers are opposed to each other so that spring rigidity that is adapted to be exhibited by the partition walls at times of vibration input in the first diametric direction is set greater than spring rigidity that is adapted to be exhibited by the partition walls at times of vibration input in the second diametric direction, wherein in projection view in the first diametric direction, entire first fluid chambers overlap the inner shaft member while at least a part of the partition walls which partially defines walls of the first fluid chambers overlaps the inner shaft member along an entire diametrical length thereof; and in projection view in the second diametric direction, both circumferential end portions in the pair of the second fluid chambers extend beyond the inner shaft member.

2. The fluid-filled cylindrical vibration-damping device according to claim 1, wherein a stopper mechanism is provided within the pair of the second fluid chambers for limiting an amount of relative displacement of the inner shaft member and the outer cylindrical member in the second diametric direction by means of projecting in an opposing direction of the inner shaft member and the outer cylindrical member so as to abut an inner shaft member side of the stopper mechanism and the outer cylindrical member against each other.

3. The fluid-filled cylindrical vibration-damping device according to claim 2, wherein an outside peripheral face of the inner shaft member which partially defines walls of the pair of the second fluid chambers is covered by a cushion rubber layer integrally formed with the main rubber elastic body; an orifice forming member which forms the orifice passage has a round tubular shape defined by assembling a pair of half orifice bodies respectively having half circular tube shape and is superposed against and attached to an inside peripheral face of the outer cylindrical member; and a pair of stopper projections which project from the half orifice bodies within the pair of the second fluid chambers are situated in opposition to each other with the inner shaft member being interposed therebetween in a diametrical direction perpendicular to an axis of the inner shaft member.

4. The fluid-filled cylindrical vibration-damping device according to claim 1, wherein the inner shaft member includes outside peripheral face projections which project towards the second diametric direction; and wherein in projection view in the first diametric direction, the first fluid chambers as well as the partition walls entirely overlap the inner shaft member inclusive of the outside peripheral face projections.

5. The fluid-filled cylindrical vibration-damping device according to claim 1, wherein the at least one orifice passage comprises: a first orifice passage which connects one of the first fluid chambers with one of the second fluid chambers; and a second orifice passage which connects another of the first fluid chambers with another of the second fluid chambers.

6. The fluid-filled cylindrical vibration-damping device according to claim 1, wherein the at least one orifice passage comprises: a third orifice passage which connects the pair of the second fluid chambers with each other; a fourth orifice passage which connects one of the second fluid chambers with one of the first fluid chambers; and a fifth orifice passage which connects the one of the second fluid chambers with another of the first fluid chambers.

7. The fluid-filled cylindrical vibration-damping device according to claim 1, wherein base wall faces of the second fluid chambers are flat surfaces that extend parallel with respect to the first diametric direction.

8. The fluid-filled cylindrical vibration-damping device according to claim 1, wherein an angle formed by elastic principal axes of a pair of partition walls of the first fluid chamber is set smaller than an angle formed by elastic principal axes of a pair of partition walls of the second fluid chamber.

* * * * *